(12) United States Patent
Golko et al.

(10) Patent No.: US 10,320,230 B2
(45) Date of Patent: Jun. 11, 2019

(54) TEMPERATURE MANAGEMENT FOR INDUCTIVE CHARGING SYSTEMS

(71) Applicant: Apple Inc., Cupertino, CA (US)

(72) Inventors: Albert J. Golko, Cupertino, CA (US); Eric S. Jol, Cupertino, CA (US); Christopher S. Graham, Cupertino, CA (US); Paul J. Thompson, Cupertino, CA (US); Jeffrey M. Alves, Cupertino, CA (US); Stephen E. Yao, Cupertino, CA (US); Makiko K. Brzezinski, Cupertino, CA (US); Todd K. Moyer, Cupertino, CA (US); Daniel Wagman, Cupertino, CA (US); Micah Lewis-Kraus, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 14/668,551

(22) Filed: Mar. 25, 2015

(65) Prior Publication Data

US 2015/0280483 A1 Oct. 1, 2015

Related U.S. Application Data

(60) Provisional application No. 61/970,627, filed on Mar. 26, 2014.

(51) Int. Cl.
*H02J 7/02* (2016.01)
*H02J 50/10* (2016.01)
(Continued)

(52) U.S. Cl.
CPC ............ *H02J 50/10* (2016.02); *H01F 27/025* (2013.01); *H01F 38/14* (2013.01); *H02J 7/0042* (2013.01);
(Continued)

(58) Field of Classification Search
CPC ....................................................... H02J 7/025
(Continued)

(56) References Cited

U.S. PATENT DOCUMENTS

| 6,452,093 B1 * | 9/2002 | Ishii .................. G06F 1/163 |
| | | 174/16.3 |
| 7,948,208 B2 | 5/2011 | Partovi et al. |

(Continued)

FOREIGN PATENT DOCUMENTS

| CN | 101447683 A | 6/2009 |
| CN | 102177043 A | 9/2011 |

(Continued)

OTHER PUBLICATIONS

PCT/US2015/022540, "International Preliminary Report on Patentability", dated Sep. 27, 2016, 12 pages.

(Continued)

*Primary Examiner* — Richard Isla
*Assistant Examiner* — Johali A Torres Ruiz
(74) *Attorney, Agent, or Firm* — Kilpatrick Townsend and Stockton, LLP

(57) ABSTRACT

A thermal management system for an electromagnetic induction-power transfer system. The system may include a charging apparatus including a housing that defines an interface surface. An accessory or induction-power consuming apparatus may be positioned proximate to the interface surface. The housing of the charging apparatus may include a power source and a power-transferring coil coupled to the power source and positioned below the interface surface. A thermal mass may be positioned within the housing and spaced apart from the interface surface. The housing may include a thermal path that is configured to conduct heat from the interface surface to the thermal mass.

23 Claims, 7 Drawing Sheets

(51) Int. Cl.
  *H02J 7/00* (2006.01)
  *H02J 50/90* (2016.01)
  *H02J 50/70* (2016.01)
  *H01F 27/02* (2006.01)
  *H01F 38/14* (2006.01)
  *H02J 50/12* (2016.01)
  *H01F 27/22* (2006.01)

(52) U.S. Cl.
  CPC .............. *H02J 50/70* (2016.02); *H02J 50/90* (2016.02); *H01F 27/22* (2013.01); *H02J 50/12* (2016.02)

(58) Field of Classification Search
  USPC ........................................................ 320/108
  See application file for complete search history.

(56) References Cited

U.S. PATENT DOCUMENTS

| | | | |
|---|---|---|---|
| 7,952,322 B2 | 5/2011 | Partovi et al. | |
| 8,169,185 B2 | 5/2012 | Partovi et al. | |
| 8,629,652 B2 | 1/2014 | Partovi et al. | |
| 8,629,654 B2 | 1/2014 | Partovi et al. | |
| 8,890,470 B2 | 11/2014 | Partovi | |
| 8,896,264 B2 | 11/2014 | Partovi | |
| 8,901,881 B2 | 12/2014 | Partovi | |
| 8,947,047 B2 | 2/2015 | Partovi et al. | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,178,369 B2 | 11/2015 | Partovi | |
| 2002/0046866 A1 | 4/2002 | Ishii et al. | |
| 2006/0232929 A1* | 10/2006 | Huang | G06F 1/1632 361/688 |
| 2009/0278523 A1 | 11/2009 | Yoda et al. | |
| 2011/0050164 A1* | 3/2011 | Partovi | H01F 5/003 320/108 |
| 2011/0221385 A1 | 9/2011 | Partovi et al. | |
| 2012/0001496 A1* | 1/2012 | Yamamoto | H01F 27/2876 307/104 |
| 2012/0212178 A1* | 8/2012 | Kim | H02J 50/10 320/108 |
| 2012/0236501 A1* | 9/2012 | Nagasawa | G06F 1/203 361/701 |
| 2012/0262109 A1* | 10/2012 | Toya | H01M 10/44 320/108 |
| 2013/0093388 A1 | 4/2013 | Partovi | |
| 2013/0099563 A1 | 4/2013 | Partovi et al. | |
| 2013/0234656 A1* | 9/2013 | Lambert | H02J 7/0042 320/108 |
| 2013/0249479 A1 | 9/2013 | Partovi | |
| 2013/0260677 A1 | 10/2013 | Partovi | |
| 2013/0271069 A1 | 10/2013 | Partovi | |
| 2013/0285604 A1 | 10/2013 | Partovi | |
| 2013/0285605 A1 | 10/2013 | Partovi | |
| 2013/0300204 A1 | 11/2013 | Partovi | |
| 2014/0077758 A1 | 3/2014 | Kaushik et al. | |
| 2014/0103873 A1 | 4/2014 | Partovi et al. | |
| 2014/0111953 A1* | 4/2014 | McClure | G06F 3/044 361/749 |
| 2014/0132210 A1 | 5/2014 | Partovi | |
| 2014/0132211 A1* | 5/2014 | Kim | H02J 50/12 320/108 |
| 2014/0191568 A1 | 7/2014 | Partovi | |
| 2014/0253025 A1* | 9/2014 | Van Wiemeersch | H02J 7/025 320/108 |
| 2014/0285140 A1* | 9/2014 | Jung | H02J 7/025 320/108 |
| 2014/0306654 A1 | 10/2014 | Partovi | |
| 2015/0130412 A1 | 5/2015 | Partovi | |
| 2015/0145475 A1 | 5/2015 | Partovi et al. | |

FOREIGN PATENT DOCUMENTS

| | | | |
|---|---|---|---|
| CN | 102449711 A | 5/2012 | |
| CN | 102508528 A | 6/2012 | |
| CN | 102656648 A | 9/2012 | |
| CN | 102738531 A | 10/2012 | |
| CN | 103026436 | 4/2013 | |
| CN | 103250325 A | 8/2013 | |
| CN | 103419723 A | 12/2013 | |
| EP | 1032250 | 8/2000 | |
| JP | 344716 A | 12/1992 | |
| JP | H04344716 | 12/1992 | |
| JP | 2000251544 A | 9/2000 | |
| JP | 2003272938 | 9/2003 | |
| JP | 2003272938 A * | 9/2003 | ............. H01F 38/14 |
| JP | 2009273260 A | 11/2009 | |
| JP | 2011072115 A | 4/2011 | |
| JP | 2012130177 | 7/2012 | |
| JP | 2012199370 | 10/2012 | |
| JP | 5480573 B2 | 2/2014 | |
| JP | 2017511113 A | 4/2017 | |
| WO | 2014057587 | 4/2014 | |

OTHER PUBLICATIONS

International Search Report and Written Opinion, PCT/US2015/022540, 18 pages, dated Jul. 16, 2015.
AU2015236068, "First Examiner Report", dated Apr. 27, 2017, 4 pages.
CN201580015504.3, "Office Action", dated Apr. 19, 2017, 27 pages.
Office Action in Korea Application No. KR10-2016-7024730, dated Oct. 27, 2017 in 15 pages.
Chinese Patent Application No. 201580015504.3 , "Office Action", dated Mar. 15, 2018, 13 pages.
Japanese Patent Application No. 2016-572382 , "Office Action", dated Apr. 9, 2018, 8 pages.
Notice of Decision to Grant for JP2016-572382 dated Nov. 12, 2018, 3 pages.
Notice of Decision to Grant CN20158001550 dated Dec. 6, 2018, 12 pages.
Office Action KR10-2016-7024730 dated Nov. 28, 2018, 3 pages.
Office Action for Japanese Application No. JP2016-572382, dated Jun. 26, 2017 in 10 pages.

* cited by examiner

TEMPERATURE MANAGEMENT FOR INDUCTIVE CHARGING SYSTEMS

CROSS-REFERENCE TO RELATED APPLICATIONS

This application is a nonprovisional patent application of, and claims the benefit to, U.S. Provisional Patent Application No. 61/970,627, filed Mar. 26, 2014 and titled "Temperature Management for Inductive Charging Systems," the disclosure of which is hereby incorporated herein in its entirety.

TECHNICAL FIELD

This disclosure relates to temperature control for electromagnetic induction power-transfer systems, and in particular to systems and methods for dissipating heat away from an interface surface of a power-consuming electronic device.

BACKGROUND

Electronic devices, such as smart phones, tablet computers, laptop computers, wearable devices, sports devices, health devices, medical devices, and navigation devices, may be powered by one or more internal batteries that may be charged by connecting the batteries via a physical cable or a wireless charging apparatus to an external power source. The operation of charging may generate heat, which may be undesirable.

SUMMARY

Embodiments described herein may relate to, include, or take the form of a charging apparatus (e.g., dock) including at least a housing defining an interface surface, a power source within the housing, a power-transferring coil coupled to the power source and positioned below the interface surface, and a thermal mass within the housing and spaced apart from the interface surface. These embodiments can also include a thermal path adapted to conduct heat from the interface surface to the thermal mass. In this manner, heat can be conveyed from the interface surface to the thermal mass via the thermal path, where, thereafter, the accumulated heat can be dissipated in a controlled manner.

Some embodiments can also include a cable for conveying power or data to the charging apparatus. The cable can be attached to the housing and can include a conductor pair and a thermally conductive shield layer surrounding the conductor pair. In these embodiments, the conductive shield layer may be thermally coupled to the thermal mass. In this manner, heat in accumulated in the thermal mass can be dissipated in a controlled manner through the cable. Some embodiments may include a configuration in which the cable further includes a thermally conductive sheath enclosing the conductor pair and the thermally conductive shield layer. In these embodiments, the thermally conductive sheath can be thermally coupled to the thermally conductive shield layer.

Other embodiments may include a configuration in which the interface surface may be configured to engage a surface of an external power-consuming apparatus (e.g., accessory). In these embodiments the power-transferring coil may be configured to inductively couple to a power-consuming coil within the power-consuming apparatus. In these embodiments, the interface surface may be configured to direct heat from the power-consuming apparatus to the thermal path, which in turn can direct heat to the thermal mass.

Some embodiments may include a configuration in which the interface surface includes a surface feature that may be configured to engage with the surface of the power-consuming apparatus. For example, some embodiments may include a configuration in which the surface feature is an axially symmetric and curved indentation. In other examples, the surface feature may be configured to provide an air gap between the interface surface and the surface of the power-consuming apparatus. In these examples, the air gap may be configured to reduce an amount of heat from passing from the charging apparatus to the power-consuming apparatus. In some embodiments, the power-consuming coil can include a select number of turns configured selected so as to reduce magnetizing inductance within the power-transferring coil. Still further embodiments can include a configuration in which the thermal path includes one or more thermal vias which can, in certain implementations, couple the interface surface directly to the thermal mass.

Other embodiments described herein may relate to, include, or take the form of an inductive power-transferring apparatus including at least a housing with an upper portion, a base portion incorporating a thermal mass, and a thermal path thermally coupling the upper portion (or an interface surface thereof) and the thermal mass. In these embodiments, the thermal path can have a thermal conductivity greater than the upper portion in order to facilitate transfer of heat from the upper portion to the thermal mass. In these embodiments, the thermal path can include a thermal via extending from the interface surface to the thermal mass. Additionally, some embodiments may include a configuration in which the thermal path may be formed of a metal, a polymer doped with a thermally conductive material, or a ceramic doped with the thermally conductive material.

In some cases the thermal mass can include specialized geometry. For example, the thermal mass of some embodiments can include a configuration in which at least a portion of thereof forms an electromagnetic interference shield. Still further embodiments may include a configuration in which the upper portion of the power-transferring apparatus includes or is formed from an electrically insulating and thermally conducting material. In further embodiments, the upper portion can be formed from a plastic doped with thermally conductive metal filaments. In many embodiments, the power-transferring coil may be formed from a material including one or more of a copper alloy material, silver alloy material, or copper-silver alloy material.

Certain further embodiments may include a configuration in which at least a portion of the thermal mass further operates as a heat sink for a component disposed within the housing. In many examples, the component can be an electrical component such as an analog or digital electrical component.

Additional embodiments may include a configuration in which the power-transferring apparatus also includes a processing unit. In many examples, the processing unit can be coupled to or may include a temperature sensor. In these embodiments, the processing unit may be configured to discontinue current to the power-transferring coil upon determining that a selected temperature threshold may be reached.

Still further embodiments described herein may relate to, include, or take the form of a method for managing temperature of an electromagnetic induction power-transferring apparatus including at least the operations of receiving, at an interface surface of the apparatus, heat from an accessory positioned proximate to the apparatus, directing the received heat through at least one thermal path to a thermal mass, and directing heat within the thermal mass to a cable for connecting to a power outlet, the cable with a thermally conductive layer. These embodiments may include a configuration in which the operation of directing the heat within the thermal mass to the cable includes directing heat to an electrically conductive layer surrounding a conductor pair of the cable.

Additional embodiments may include a configuration in which the operation of receiving heat from the accessory includes aligning or positioning the accessory to contact the interface surface, transmitting inductive power to the accessory, and receiving heat generated within the accessory as a result of transmitting the inductive power.

Some embodiments may include a configuration in which the operation of directing heat through the at least one thermal path to the thermal mass includes directing, to the thermal mass, heat generated within the apparatus as a result of transmitting the inductive power. Still further embodiments may include a configuration in which receiving heat from the accessory includes aligning the accessory along an axis of an interface surface, the accessory separated from the surface of the interface surface by an air gap, transmitting inductive power to the accessory, and receiving heat generated within the accessory as a result of transmitting inductive power, wherein the air gap inhibits a transfer of heat from the induction power-transferring apparatus to the accessory.

BRIEF DESCRIPTION OF THE FIGURES

Reference will now be made to representative embodiments illustrated in the accompanying figures. It should be understood that the following descriptions are not intended to limit the disclosure to one preferred embodiment. To the contrary, it is intended to cover alternatives, modifications, and equivalents as may be included within the spirit and scope of the described embodiments as defined by the appended claims.

Figure 1A:
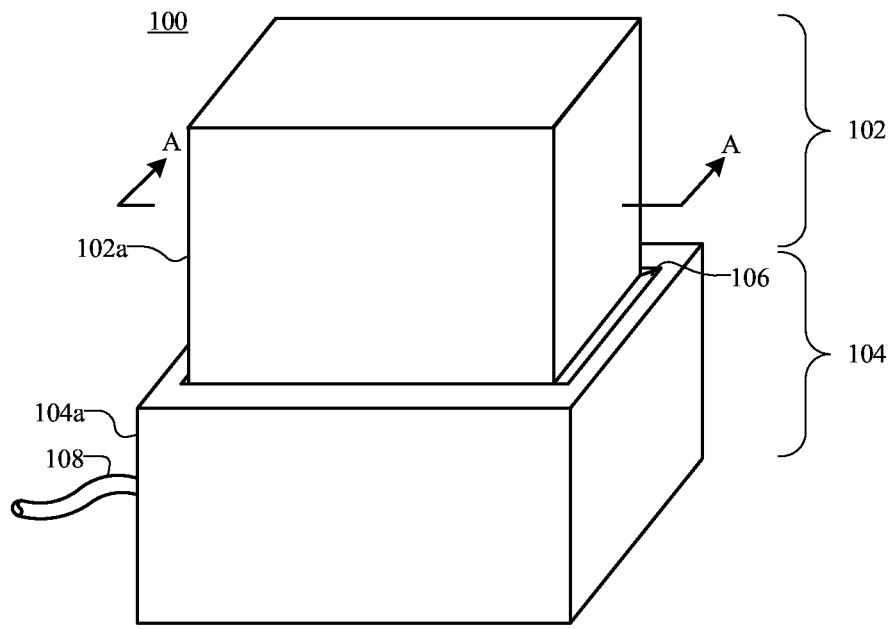
FIG. 1A depicts an isometric front view of a sample inductive power transfer system.

The use of the same or similar reference numerals in different drawings indicates similar, related, or identical items. The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference for particular materials, material properties, proportions, dimensions, commonalities of similarly-illustrated elements, or any other characteristic, attribute, or property for any element illustrated in the accompanying figures.

DETAILED DESCRIPTION

Embodiments described herein relate to and take the form of methods and apparatuses for managing the temperature of a wireless charging interface. Some embodiments described herein may relate to or take the form of methods and apparatuses for managing heat generated by the operation of an inductive charging interface. Embodiments may include active or passive heat sinks, thermal path(s) to transfer heat from one or more hot spots (such as an inductive coil) to a thermal mass (that may radiate, dissipate, or sink the heat), charging methodologies that increase charging efficiency and thereby reduce wasted heat, and other structures and methods to improve efficiency of power transfer across an inductive charging interface. In various embodiments, power transfer efficiency may be achieved by varying an active time of the charger, changing a frequency at which inductive power is transmitted, monitoring a load on an inductive transmitter and varying power transmitted accordingly, and so on.

An inductive charging system may include an inductive power-transferring apparatus (e.g., "dock" or "charging station"), to transmit power and a power-consuming apparatus such as a portable electronic device (e.g. "accessory") to receive power. Such electronic devices may include media players, media storage devices, personal digital assistants, tablet computers, cellular telephones, laptop computers, smart phones, styluses, global positioning sensor units, remote control devices, wearable devices, electric vehicles, home appliances, medical devices, health monitoring devices, sports devices, accessory devices, and so on.

A dock can include a power-transferring inductor (e.g., "power-transferring coil") and an accessory can include a power-consuming inductor (e.g. "power-consuming coil"). In these examples, temperature maintenance of the accessory may be a substantially higher priority than temperature maintenance of the dock. In this manner, the dock may sacrificially accept as much heat as possible from the accessory. In certain cases, the dock may include a cooling element, such as a Peltier element, in order to actively reduce the temperature of the accessory. In other cases, the dock may passively reduce the temperature of the accessory by thermally coupling a surface of the accessory to a thermal mass included within the dock.

Related embodiments may include a configuration of the dock including a housing with an upper portion having an interface surface or area on which the accessory may be placed, a base portion having a thermal mass, and a thermal path thermally coupling the two.

In many cases, the thermal mass may be made of aluminum or other metals. The material, and mass, of the thermal mass may be chosen at least in part on the heat capacity of the material selected therefore. For example, a thermal mass composed of copper may have a lower heat capacity than a thermal mass composed of aluminum, and thus the mass of a copper thermal mass may in some cases be larger than the mass of a thermal mass composed of aluminum. In other cases metal alloys may be used. In still further embodiments, the thermal mass may be formed of multiple layers of differing materials, such as a liquid core surrounded by aluminum plated in silver. In these embodiments, heat generated by the accessory placed on the interface surface (e.g., interface area) and/or generated by the dock or heat may be absorbed within the thermal mass, to be dissipated in a controlled manner.

In many cases, the dock may include a cable or cable connector for connecting to a power outlet. The cable can include a thermally conductive shield layer or sheath thermally coupled to the thermal mass. As used herein "thermally conductive" may be understood to refer to a thermal conductivity greater than or equal to a thermal conductivity typically associated with metal materials. In many cases, the thermally conductive shield layer may be made of metal and may be of a certain thickness of a material selected specifically for the material's thermal conductivity. In these and related cases, heat stored within the thermal mass may be safely and efficiently transferred away from the thermal mass into the cable.

In this manner, the dock may sacrificially accept as much heat as possible from the accessory into the bulk of the thermal mass, after which the heat in the bulk can be dissipated into the cable, or into the ambient environment.

An accessory or a dock may generate heat that can be conveyed to and accumulated in the thermal mass in several ways. For example, during operation of an inductive power transfer system, the accessory may activate circuitry associated with managing and distributing power received from the dock.

More particularly, when placed inductively proximate a dock, an accessory may communicate to the dock via a wireless or wired communication channel that the accessory is ready to receive power. After receiving such a signal the dock may apply an alternating or switched current to its power-transferring coil which, in turn, can induce an electrical current in the power-consuming coil within the accessory. The accessory may use the received current to, in one example, replenish the charge of the one or more rechargeable batteries disposed within the accessory.

However, in many cases, eddy currents may be induced in any conductor proximate the power-transferring coil. Generally, an eddy current is an electrical current excited within conductive elements in the presence of a time-varying magnetic field. In many cases, eddy currents may result in heating of the conductive elements, which in turn may increase the temperature of the conductive elements and other elements nearby. For example, eddy currents may be excited in conductive components of circuitry (e.g., copper traces, leads, and so on) and/or conductive structural elements (e.g., fasteners, housings, and so on), increasing the temperature of the entire device. Accordingly, many embodiments described herein convey such heat to the thermal mass within the dock so as to mitigate unnecessary or undesirable heating of the accessory during operation of the inductive power transfer interface.

Other embodiments described herein take the form of power efficiency management systems within a wireless charging base, such as a dock. Typically, increasing the efficiency of power transfer across an inductive interface decreases energy lost in the form of heat. In other words, increases in power transfer efficiency may be associated with, or may result in, lower temperature while power is being transferred.

Power management embodiments may take the form of adaptive power efficiency management systems within both a transmitter and receiver of inductive energy (e.g., dock and accessory, respectively). For example, when an accessory is placed inductively proximate a dock, the dock may activate inductive power transfer circuitry. At all other times, the interactive power transfer circuitry may be completely powered off.

In these and related embodiments, a power-transferring coil within a dock may inductively couple with a power-consuming coil within an accessory. Upon coupling, the power-transferring coil may experience an increased load. Accordingly, when the power requirements of an accessory change, the load experienced by the power-transferring coil may also change. To account for changes in power requirements of various accessories or different operational modes of a single accessory, the inductive power transfer circuitry within the dock may include a current monitor. The current monitor may be positioned across a resistor of known resistance within a circuit providing power to the power-transferring coil. In this manner, the current load through the power-transferring coil may be estimated at any given time and the transmitted power adjusted accordingly.

In further embodiments, the output from the current monitor may be used to control a selected operational frequency of the power-transferring coil. For example, in certain embodiments more power may be transferred at lower frequencies than at higher frequencies. Accordingly, if the current monitor determines that the loading of the power-transferring coil has increased, the frequency of the output of the power source may be lowered in order to transmit more power. In the alternative, if the current monitor determines that the loading of the power-transferring coil has decreased, the frequency of the output of the power source may be raised in order to transmit less power. In some embodiments, increases in load may result in an increase in frequency and a decrease in load may result in a decrease in frequency. In this manner, the inductive charging system may obtain or produce increased power efficiency by not transmitting more power than is required of a device coupled with the power-transferring coil.

In still further embodiments, other properties of the output of the power source may be changed as a result of detected changes in the loading of the power-transferring coil. For example, the voltage applied to the power-transferring coil may be increased or decreased in response to increases or decreases in load applied to the power-transferring coil. In these embodiments, increased efficiency of power transfer may correlate to a decrease in generated heat.

In certain further embodiments, the power output from the dock may be controlled or influenced by periodic reports from the accessory itself. For example, an accessory may include a wireless transmitter configured to transmit information to a dock. Such information may include identifying information, authentication information, thermal information (such as an operating temperature, change in temperature, maximum operating temperature, and so on) and/or power state information. Power state information may include current or future power requirements, time estimations until a battery is fully charged, the current charge of the battery, or other power related information. The accessory may send periodic updates, once or more per second. The wireless transmitter may be of any suitable technology such as, for example, Wi-Fi, RF, Bluetooth, near field communication, or infrared. In certain embodiments, the wireless transmitter may be an existing component of the accessory, such as a camera flash or a display.

A dock may include a receiver to receive signals sent from an inductively coupled accessory. The dock may interpret these signals in order to augment, adjust or otherwise change the frequency of the output of the power source. For example, if the accessory sends a signal that it requires 5 volts at 1 amp, the frequency of the output of the power source may be a different value than if the accessory sends a signal that it requires 3 volts at 1 amp. In some embodiments, the dock may interpret the signals received by the receiver to augment, adjust, or otherwise change certain mutable properties of the output of the power source. For example, voltage, current, frequency, and other characteristics of the output signal may be modified accordingly.

In further embodiments, the dock may use a combination of information received from the accessory and information measured from the current monitor to dynamically, intelligently, and rapidly. For example, the current monitor may note an increased load on the power-transferring coil hundreds of milliseconds before the next update signal is received from the accessory. In such a case, the current monitor may increase the power output immediately and, upon confirmation that the power requirements of the accessory have increased at the next signal, retain the newly-determined higher power transmission frequency. In the alternative, if the current monitor notes an increased load that is not confirmed upon receipt of the next signal from the accessory, the power transmission frequency may be re-set to a previous value.

The aforementioned and related embodiments may reduce quantity of heat produced by losses and inefficiencies inherent to an inductive power transfer interface. In this manner, the temperature of the system may be reduced.

Some embodiments described herein may relate to and take the form of methods and systems for managing temperature increases across an inductive charging interface. In these cases, heat produced by losses and inefficiencies inherent to the inductive power transfer interface may be effectively and efficiently directed away from the accessory into a thermal mass disposed within the dock.

FIG. 1A is an isometric front view of a sample inductive power transfer system. The inductive charging system 100 may include an inductive power receiver 102 disposed within a housing 102a and an inductive power transmitter 104 disposed within a housing 104a. In the illustrated embodiment, the inductive power transmitter 104 may be connected to mains power (e.g., power outlet) by a cable 108. In various implementations and embodiments, the inductive power transmitter 104 and the inductive power receiver 102 may be configured within or as a component of any kind or type of electronic device such as cell phones, smart phones, tablet computers, laptop computers, navigation devices, sports devices, health devices, medical devices, accessory devices, peripheral input devices, and so on. In some embodiments, the inductive charging system can be implemented within a wearable electronic device such as the smart watch illustrated in FIG. 1B.

As shown, the inductive power receiver 102 may include a lower surface that may interface with, align or otherwise contact an interface surface 106 formed in an upper portion of the housing 104a of the inductive power transmitter 104. In this manner, the inductive power receiver 102 and the inductive power transmitter 104 may be positionable with respect to each other. In certain embodiments, the interface surface 106 may be configured in a particular shape that is intended to mate with a complementary shape of the inductive power receiver 102. For example, as illustrated, the interface surface 106 may be formed as a concave shape (e.g., curved indentation) following a select curve. In some embodiments, the interface surface 106 may take another shape, for example a convex shape or a planar shape. In certain embodiments, the interface surface 106 may be axially symmetric while in others the surface may be axially asymmetric.

Figure 1B:
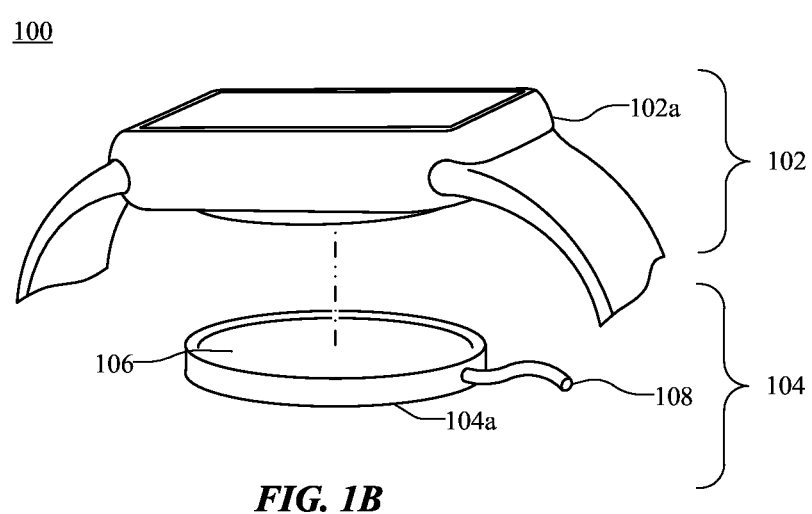
FIG. 1B depicts a perspective front view of a sample inductive power transfer system implemented as a wearable electronic device.

In some examples, and as illustrated in FIG. 1B, the interface surface 106 may take a concave shape matching or mating to a convex shape formed on the lower surface of the inductive power receiver 102 (shown here as a watch). In this manner, the curvature of the interface surface 106 can guide the inductive power receiver 102 to ultimately rest in a substantially mated configuration (e.g., convex and concave curvature apexes resting adjacent to one another) when the inductive power receiver 102 is positioned on the inductive power transmitter 104. In other examples, the interface surface 106 can be flat, faceted, or concave. In further embodiments, the interface surface 106 can take any suitable shape.

Although shown with the inductive power receiver 102 as sized with a horizontal cross-section less than that of the inductive power transmitter 104, such a relationship is not required. For example, in certain embodiments, the inductive power receiver 102 may include a horizontal cross-section larger than the inductive power transmitter 104 (see, e.g., FIG. 1B). In these examples, the interface area of the inductive power receiver 102 may include an interface surface 106 sized as only a portion of a bottom surface of the inductive power receiver 102.

As noted above, the inductive power receiver 102 can be implemented as (or as a portion of) any number of electronic devices. For example, in some embodiments, the inductive power receiver 102 can be implemented as the wearable electronic device depicted in FIG. 1B. In this example, the wearable electronic device can include within a housing 102a, a processor, a memory, a power supply and/or battery, network communications, touch sensors, input sensors, force sensors, environmental sensors, one or more display screens, acoustic elements, input/output ports, haptic elements, digital and/or analog circuitry for performing and/or coordinating tasks of the wearable electronic device, and so on. In some examples, wearable electronic device can communicate with a separate electronic device via one or more proprietary and/or standardized wired and/or wireless interfaces. For simplicity of illustration, the wearable electronic device is depicted in FIG. 1B without many of these elements, each of which may be included, partially, optionally, or entirely, within the housing 102a.

Figure 2:
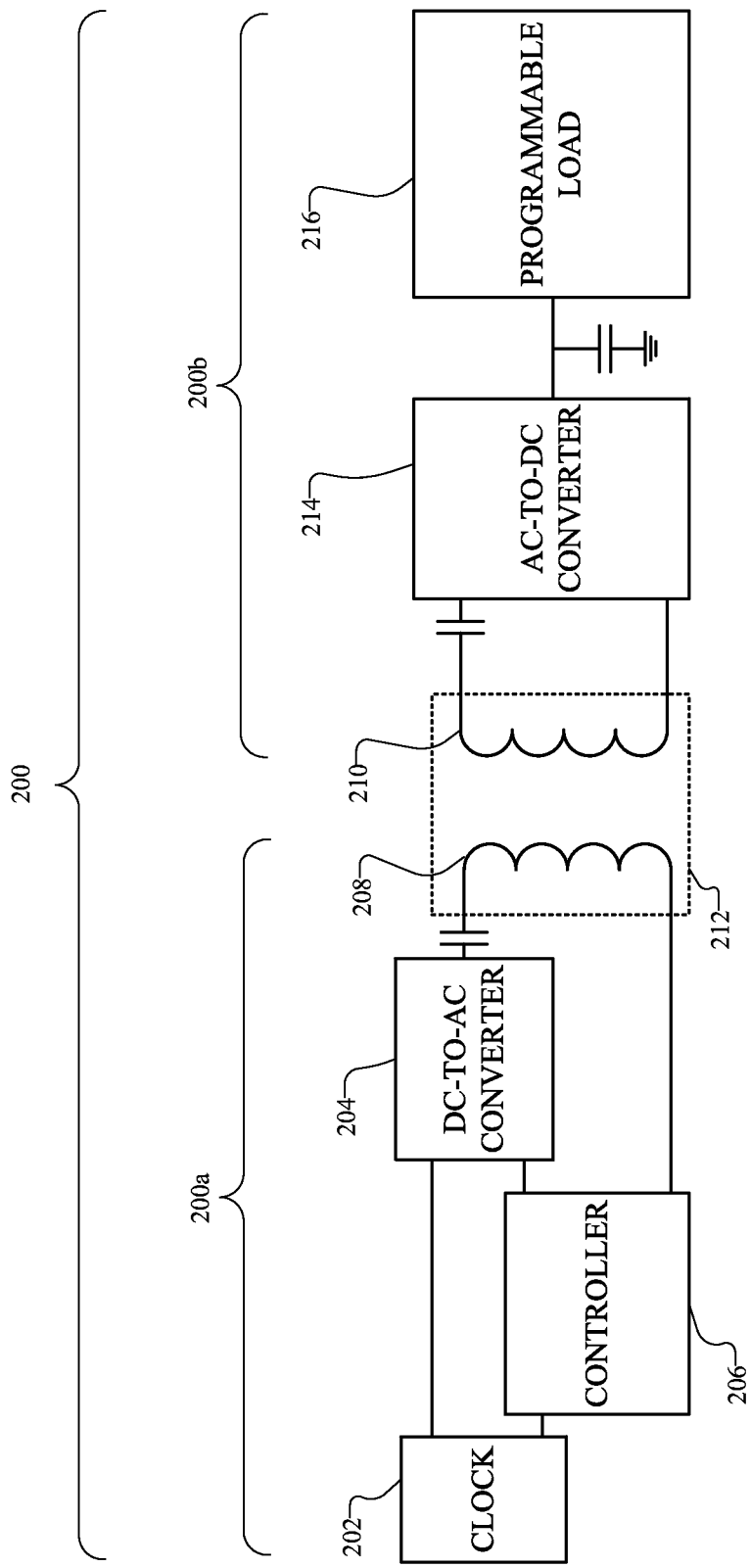
FIG. 2 depicts a simplified block diagram of a sample inductive power transfer system.

FIG. 2 is a simplified block diagram of a sample inductive power transfer system. The inductive charging system 200 can include a transmitter portion 200a and a receiver portion 200b. The transmitter portion 200a may include a clock circuit 202 operatively connected to a controller 206 and a direct current converter 204. The clock circuit 202 can generate one or more timing signals for the inductive charging system 200. The controller 206 may control the state of the direct current converter 204. In one embodiment, the clock circuit 202 generates periodic signals that are used by the controller 206 to activate and deactivate switches in the direct current converter 204 on a per-cycle basis. Any suitable direct current converter can be used in the inductive charging system 200. For example, in one embodiment, an H bridge may be used as a direct current converter. In some embodiments, an H bridge may not be required. For example, a single switch may control the flow of current from the direct current converter 204. In this manner, the direct current converter 204 may function as a square wave generator.

The time-varying signal (e.g., alternating signal) or square wave signal produced by the direct current converter 204 may be input into a transformer 212. Between the direct current converter 204 and the transformer 212 a capacitor can be disposed to provide high pass filtering. Typically, a transformer such as those used in the above-referenced tethered power transfer systems includes a power-transferring coil coupled to a power-consuming coil, with each coil wrapped about a common core. However, an inductive charging system as described herein typically includes a primary coil and a power-consuming coil separated by a gap and, in some embodiments, the respective housings 102a, 104a containing each coil. As illustrated, transformer 212 may not necessarily be a physical element but instead may refer to the relationship and interface between two inductively proximate electromagnetic coils such as a power-transferring coil 208 and a power-consuming coil 210.

The foregoing is a simplified description of the transmitter portion 200a and its interaction with a power-consuming coil 210 of the receiver portion 200b of an inductive charging system 200. The transmitter portion 200a may be configured to provide a time-varying voltage to the power-transferring coil 208 in order to induce a voltage within the power-consuming coil 210. Although both alternating currents and square waves were addressed as examples, one may appreciate that other waveforms are contemplated. In such a case, the controller 206 may control a plurality of states of the direct current converter 204. For example, the controller 206 may control the voltage, current, duty cycle, waveform, frequency, or any combination thereof.

The controller 206 may periodically modify various characteristics of the waveforms applied to the power-transferring coil 208 in order to increase the efficiency of the operation of the power-transferring circuitry. The various modifications may be made in real time, in a predetermined sequence, or may be fixed from time to time. One may appreciate that specific modifications may be desirable for specific circumstances.

For example, in certain cases, the controller 206 may discontinue all power to the power-transferring coil 208 if it is determined that the power-consuming coil 210 is not be inductively proximate the power-transferring coil 208. This determination may be accomplished in any number of suitable ways. For example, the controller 206 may be configured to detect the inductive load on the power-transferring coil 208. If the inductive load falls below a certain selected threshold, the controller 206 may conclude that the power-consuming coil 210 may not be inductively proximate the power-transferring coil 208. In such a case, the controller 206 may discontinue all power to the power-transferring coil 208.

In other cases, in one embodiment the controller 206 may set the duty cycle to be at or near a resonance frequency of the transformer 212. In another example, the period of the waveform defining the active state of the duty cycle (e.g., high) may be selected to be at or near the resonance frequency of the transformer 212. One may appreciate that such selections may increase the power transfer efficiency between the power-transferring coil 208 and the power-consuming coil 210 and, accordingly, decrease thermal losses within the system.

In an alternate example, the controller 206 may discontinue all power to the power-transferring coil 208 if a sudden spike in inductive load is sensed. For example, if the inductive load spikes at a particular rate above a certain selected threshold the controller 206 may conclude that an intermediate object may be placed inductively proximate the power-transferring coil 208. In such a case, the controller 206 may discontinue all power to the power-transferring coil 208. Alternately, such a spike in inductive load may be used as a signal to active inductive charging and thus to power the power-transferring coil 208.

In still further examples, the controller 206 may modify other characteristics of the waveforms applied to the power-transferring coil 208. For example, if the receiver circuitry requires additional power, the controller 206 may increase the duty cycle of the waveform applied to the power-transferring coil 208. In a related example, if the receiver circuitry requires less power, the controller 206 may decrease the duty cycle of the waveform applied to the power-transferring coil 208. In each of these examples, the time average power applied to the power-transferring coil 208 may be modified.

In another example, the controller 206 may be configured to modify the amplitude of the waveform applied to the power-transferring coil 208. In such an example, if the receiver circuitry requires additional power, the controller 206 may amplify the maximum voltage of the waveform applied to the power-transferring coil 208. In the related case, the maximum voltage of the waveform may be reduced if the receiver circuitry requires less power.

Turning back to FIG. 2, and as noted above, the transmitter portion 200a of the inductive charging system 200 may be configured to provide a time-varying signal to the power-transferring coil 208 in order to induce a voltage within the power-consuming coil 210 in the receiver portion 200b through inductive coupling between the power-transferring coil 208 and the power-consuming coil 210. In this manner, power may be transferred from the power-transferring coil 208 to the power-consuming coil 210 through the creation of a varying magnetic flux by the time-varying signal in the power-transferring coil 208.

The time-varying signal produced in the power-consuming coil 210 may be received by a direct current converter 214 that converts the time-varying signal into a DC signal. In some embodiments, a filter capacitor can be positioned between the direct current converter 214 and the power-consuming coil 210. Any suitable direct current converter can be used in the inductive charging system 200. For example, in one embodiment, a rectifier may be used as a direct current converter. The DC signal may then be received by a programmable load 216. In some embodiments, a low-pass filter capacitor can be positioned between the direct current converter 214 and circuit ground, stabilizing the direct current signal prior to use by the programmable load 216.

In some embodiments, the receiver direct current converter may be a half bridge. In such examples, the power-consuming coil 210 may have an increased number of windings. For example, in some embodiments, the power-consuming coil may have twice as many windings. In this manner, as one may appreciate, the induced voltage across the power-consuming coil 210 may be reduced by half, effectively, by the half bridge rectifier. In certain cases, this configuration may require substantially fewer electronic components. For example, a half bridge rectifier may require half as many transistors as a full wave bridge rectifier. As a result of fewer electronic components, resistive losses may be substantially reduced.

In certain some embodiments, the receiver may also include circuitry to tune out or reduce magnetizing inductance present within the transmitter. Generally, magnetizing inductance may result in losses within a transformer formed by imperfectly coupled coils. This magnetizing inductance, among other leakage inductance, may substantially reduce the efficiency of the transmitter. One may further appreciate that, because magnetizing inductance may be a function of the coupling between a transmit and a power-consuming coil, it may not necessarily be entirely compensated for within the transmitter itself. Accordingly, in certain embodiments discussed herein, tuning circuitry may be included within the receiver. For example, in certain embodiments, a capacitor may be positioned parallel to the programmable load 216.

In still further examples, a combination of the above-referenced sample modifications may be made by the controller. For example, the controller 206 may double the voltage in addition to reducing the duty cycle. In another example, the controller may increase the voltage over time, while decreasing the duty cycle over time. One may appreciate that any number of suitable combinations are contemplated herein.

Some embodiments may include multiple power-transferring coils. For example, if two power-transferring coils are present, each may be activated or used independently or simultaneously. In such an embodiment, the individual coils may each be coupled to the controller 206. In further examples, one of the several individual power-transferring coils may be selectively shorted. For example, a switch may be positioned in parallel to a second power-transferring coil such that when the switch is off current may run through the inductor. On the other hand, when the switch is on, no current will run through the second power-transferring coil; other switches may be configured to permit current flow only when the switch is on. The switch may be any suitable type of manual, solid state, or relay based switch. In this manner, the amount of increase in current through each of the several coils may be electively controlled. For example, in an operation with a high inductive load, the switch may be turned off to include the second power-transferring coil in the circuit with the power-transferring coil 208.

In the present disclosure, the methods disclosed may be implemented or otherwise embodied by circuitry or other digital or analog logical elements. For example, operations of "sending", "receiving", "determining", "interpreting", "requesting", "authorizing" and the like may be understood to refer to the respective inputs and outputs of circuitry configured to perform the functions described. These circuits or logical elements may also have direct or indirect control over the functionality of the receiver or transmitter respectively. Further, it is understood that the specific order or hierarchy of steps in the methods disclosed are examples of sample approaches, and may be in certain circumstances accomplished by multiple independent circuits or logical elements or, in other examples, by a single circuit or logical element. In still further examples, the referenced steps may not necessarily include or require specific decisional or intelligent circuitry. In other words, the embodiments described herein may include any combination of analog circuits, digital circuits, or software. In some embodiments, the specific order or hierarchy of steps in any method or process may be rearranged while remaining within the disclosed subject matter.

Figure 3:
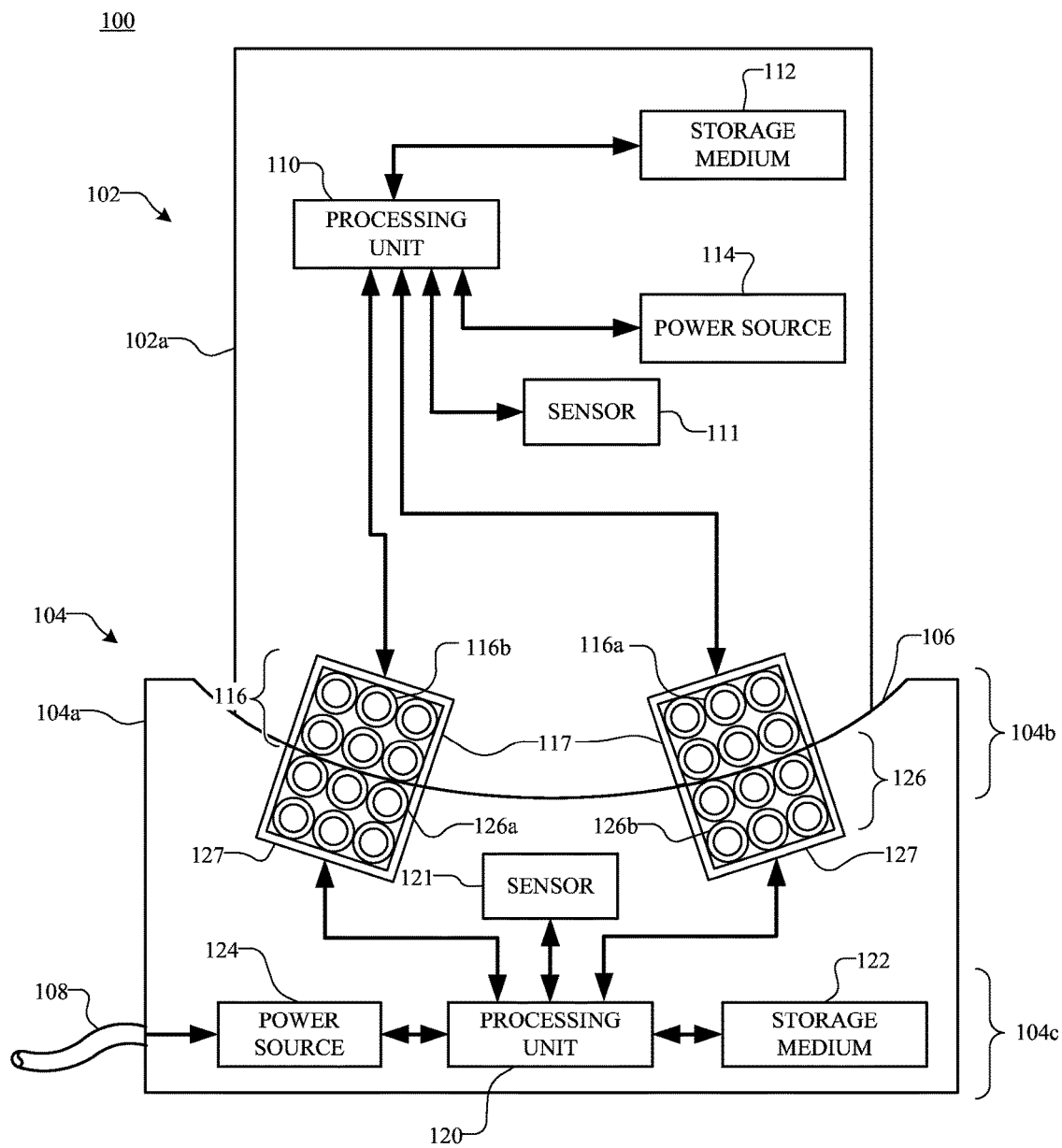
FIG. 3 depicts a cross-section view of one example configuration of the system of FIG. 1A taken along section A-A, including a simplified process flow diagram of an inductive power-consuming apparatus and a simplified process flow diagram of an inductive power-transferring apparatus.

FIG. 3 is a cross-sectional view of one example configuration of the system of FIG. 1A taken along section A-A, including a simplified block diagram of an inductive power-consuming apparatus and a simplified block diagram of an inductive power-transferring apparatus.

As illustrated, the inductive power receiver 102 may include a power-consuming coil, illustrated in cross-section as the power-consuming coil portions 116a, 116b respectively. One may appreciate that the power-consuming coil portions 116a, 116b may be diametrically opposite portions in a cross-section of the power-consuming coil 116. As shown, the power-consuming coil 116 has two layers of three turns each for a total of six turns. However, one may appreciate that any appropriate number or configuration of turns may be desirable from embodiment to embodiment. In some embodiments, the power-consuming coil 116 may have a tilted or semi-conical shape, or a curved surface, to follow a curvature of the housing 102a of the inductive power receiver 102. In many examples, the power-consuming coil 116 can be formed from an electrically conductive metal such as a copper alloy, a silver alloy, or a copper-silver alloy. In other embodiments, other types of electrically conductive materials can be used.

The inductive power receiver 102 may also include processing unit 110, a storage media 112 (e.g., transitory or non-transitory), and a power source 114. The storage media 112 may include, but may not necessarily be limited to, magnetic storage, optical storage, magneto-optical storage, read only memory, random access memory, erasable program memory, flash memory, and so on. The power source 114 may include, but may not necessarily be limited to a battery power source, a capacitive power source, or a combination thereof.

The processing unit 110 may execute instructions stored in the storage media 112 in order to perform device operations of the inductive power receiver 102.

The processing unit 110 may also be coupled to a sensor 111. For example, the sensor 111 may be a temperature sensor and may be operably connected to the power source 114 or the processing unit 110 such that, if a select temperature threshold is reached, the power source discontinues current to the inductive power receiver 102. In other embodiments, the processing unit 110 can be coupled to more than one sensor.

In many embodiments, the inductive power receiver 102 can include, within the housing 102a, other components such as displays, sensors, input devices, network communication interfaces, and so on. As with other embodiments described and illustrated herein, the inductive power receiver 102 is depicted, for simplicity of illustration, in FIG. 3 without many of these components, each of which may be included, partially, optionally, or entirely, within the housing 102a.

Similarly, the inductive power transmitter 104 may also include processing unit 120, a storage media 122, and a power source 124. The storage media 122 may include, but may not necessarily be limited to, magnetic storage, optical storage, magneto-optical storage, read only memory, random access memory, erasable program memory, flash memory, and so on. The power source 124 may include, but may not necessarily be limited to a battery power source, a capacitive power source, or a combination thereof.

The processing unit 120 may also be coupled a sensor 121. For example, the sensor 121 may be a temperature sensor may be to the power source 124 or the processing unit 120 such that if a select temperature threshold is reached, the power source discontinues current to the inductive power transmitter 104. In other embodiments, the processing unit 120 can be coupled to more than one sensor.

In many embodiments, the inductive power transmitter 104 can include within the housing 104a other components such as displays, sensors, input devices, network communication interfaces and so on. As with other embodiments described and illustrated herein, the inductive power transmitter 104 is depicted, for simplicity of illustration, in FIG. 3 without many of these other components, each of which may be included, partially, optionally, or entirely, within the housing 104a.

FIG. 3 also includes a cable 108 for connecting to a power outlet used to replenish or supplement the power source 124. In many cases, the cable 108 may include at least one conductor pair, and a thermally conductive shield layer positioned to surround the at least one conductor pair.

The inductive power transmitter 104 can include an upper portion 104b and a base portion 104c. The inductive power transmitter 104 may also include may include one or more power-transferring coil portions 126a, 126b respectively, disposed within the upper portion 104b. One may appreciate that the power-transferring coil portions 126a, 126b may be diametrically opposite portions in cross-section of a power-transferring coil 126. As shown, the power-transferring coil 126 has two layers of three turns each for a total of six turns. In some embodiments, different numbers of layers and turns may be used. For example, a power-transferring coil may include four turns in three layers each for a total of twelve turns and the power-consuming coil may include six turns in four layers for a total of twenty four turns. However, one may appreciate that any appropriate number or configuration of turns may be desirable from embodiment to embodiment. In many embodiments, the power-transferring coil 126 may have a tilted or semi-conical shape to follow a curvature of the housing 104a of the inductive power transmitter 104. In many examples, the power-transferring coil 126 can be formed from an electrically conductive metal such as copper, silver, or a copper-silver alloy. In other embodiments, other types of electrically conductive materials can be used.

The inductive power transmitter 104 may also include an interface surface 106 that takes a substantially curved shape formed within the upper portion 104b of the inductive power transmitter 104. For example, as illustrated, the interface surface 106 may be formed in a concave shape following a select curve. In some embodiments, the interface surface 106 may take another shape, for example a convex shape. In still further embodiments, the interface surface 106 may take the form of an axially symmetric shape. In this manner, when the inductive power receiver 102 and the inductive power transmitter 104 are placed adjacent to one another, the shape of the interface surface 106 may encourage the alignment shown in FIG. 3. In some implementations, one or more of the surfaces of the inductive power receiver 102 and the inductive power transmitter 104 may be formed or otherwise coated with a low friction material. By forming the one or more surfaces from a low friction material, the force of gravity may facilitate sliding the inductive power receiver 102 into the alignment as shown in FIG. 3. In still further embodiments, inductive power receiver 102 and the inductive power transmitter 104 may be correspondingly shaped to minimize the friction coefficients (e.g., a static coefficient of friction and/or kinetic coefficient of friction) between the two interfacing surfaces.

To prevent the development of eddy currents within the interface surface 106, the interface surface 106 may be constructed of a material that is thermally conductive and substantially electrically insulating. In many examples, an eddy current may be induced in a conductor in the presence of a time-varying magnetic field. In this manner, eddy currents (circling currents) may be created. These eddy currents may also produce a magnetic field in the direction opposite to the time-varying magnetic field. In this manner, the magnetic fields induced by eddy currents may redirect or oppose the time-varying magnetic field. For inductive power transfer systems, this effect may reduce the efficiency of power transfer by reducing the total flux received in a receiving coil. Also, because eddy currents circulate in a conductor without passing through any resistive elements, the resistance experienced by the eddy current may be very low. Accordingly, the induced currents may be relatively high. As a result, the eddy currents may dissipate energy as waste heat. Accordingly, to prevent eddy currents from developing within or adjacent to the interface surface 106, the interface surface 106 may be made from an electrically insulating material. For example, the interface surface 106 and any of the rest of the upper portion 104b may be formed from materials such as, but not necessarily limited to, ceramic materials, crystalline materials, sapphire materials, glass materials, and so on.

In many embodiments, the power-transferring coil 126 and power-consuming coil 116 may be enclosed by an electromagnetic shield element 117, 127 respectively. The electromagnetic shield elements may be made from any suitable material. For example, in certain embodiments, the electromagnetic shield elements 117, 127 may be formed of a crystalline alloy, such as crystalline iron silicon. In this manner, the electromagnetic shield elements 117, 127 may redirect electrical flux associated with the power-transferring coil 126 and the power-consuming coil 116 toward the interface between the inductive power receiver 102 and the inductive power transmitter 104. As a result of this redirected flux, the material and size of the power-transferring coil 126 and the power-consuming coil 116 selected may be small, providing an equivalent inductive power transfer to a larger or unshielded pair of transmit and power-consuming coils. Thus, the flux that might have otherwise radiated and dissipated outwardly from the power-consuming coil 116 may be redirected and substantially or entirely within the power-transferring coil 126. In this manner, the power received at the power-consuming coil 116 may be greater than an embodiment excluding the electromagnetic shield elements 117, 127.

Figure 4:
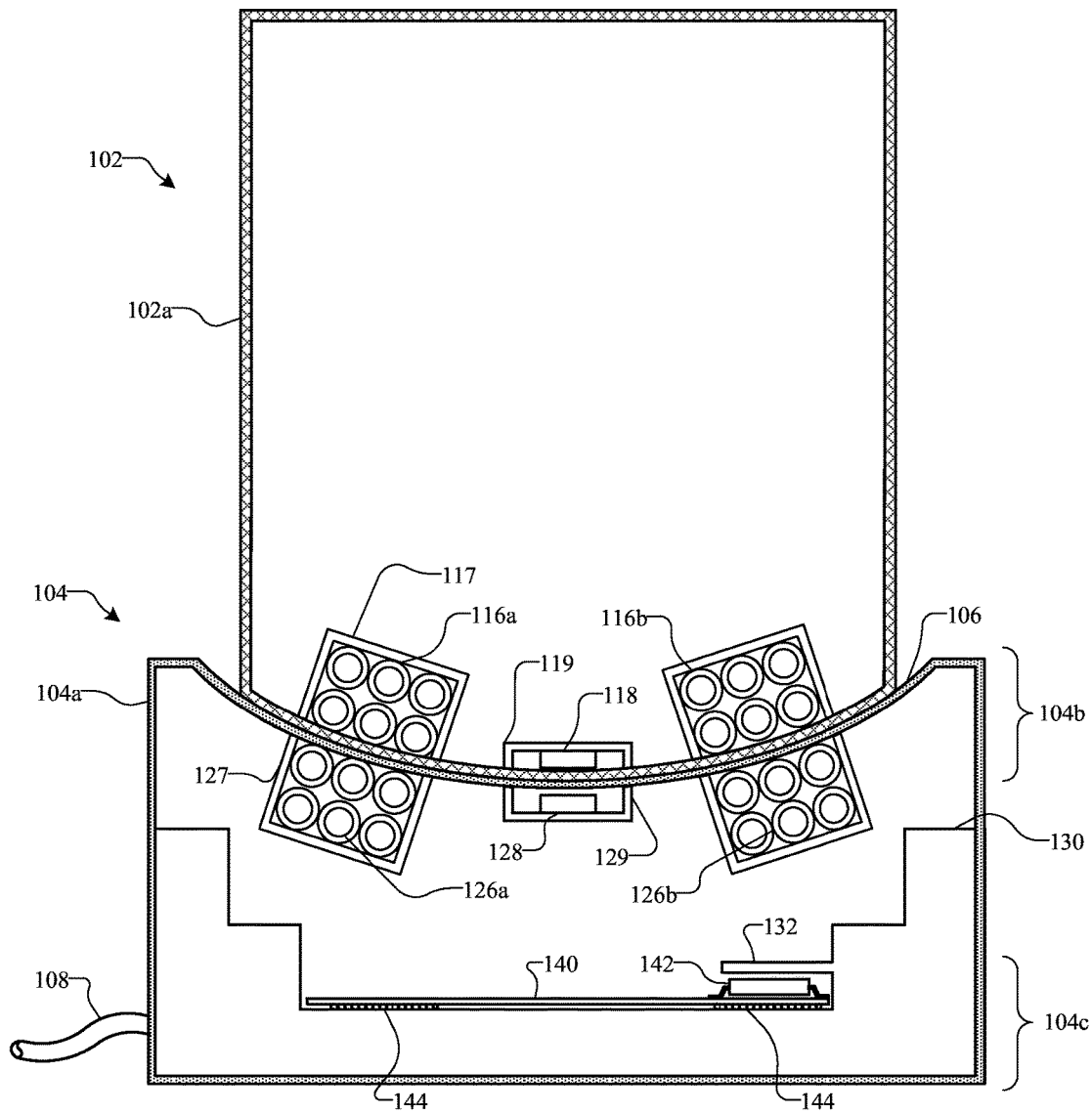
FIG. 4 depicts a cross-section view of another example configuration of the system of FIG. 1A taken along section A-A.

Some embodiments may be configured as shown in FIG. 4, which is a cross-section of another example configuration of the system of FIG. 1A taken along section A-A. As illustrated, the inductive power receiver 102 and the inductive power transmitter 104 may correspondingly each include an alignment magnet 118 and 128 respectively. As with other embodiments described and illustrated herein, either or both the inductive power receiver 102 or the inductive power transmitter 104 can include many other components (e.g., processor, memory, sensors, displays, inputs, etc.) within each respective housing 102a, 104a and, accordingly, both are illustrated in FIG. 4 without these additional components, which may be included, partially, optionally, or entirely, within each respective housing 102a, 104a.

Continue with FIG. 4, the alignment magnets 118, 128 are generally placed and/or aligned to attract one another. In this manner, the magnetic attraction between the alignment magnets 118, 128 may facilitate, encourage, or otherwise ease achievement of the alignment position shown in FIGS. 3 and 4, with the inductive power receiver 102 substantially centered on the upper surface of the inductive power transmitter 104 and the indicative charging coils of both device and charger substantially aligned. In many embodiments, each (or some, or groups) of the alignment magnets 118, 128 may be enclosed by a magnetic shield element 119, 129 respectively.

The magnetic shield elements 119, 129 of FIG. 4 may be made from any suitable material. For example, in certain embodiments, the magnetic shield elements 119, 129 may be formed of a ferromagnetic alloy, such as iron cobalt. In this manner, the magnetic shield elements 119, 129 may redirect magnetic flux associated with the alignment magnets 118, 128 toward the interface between the inductive power receiver 102 and the inductive power transmitter 104. As a result of redirected magnetic flux, the alignment magnets 118, 128 selected may be small, providing an equivalent attractive force over a smaller area to a larger or unshielded alignment magnet. In this manner, by employing alignment magnets of reduced size, the total mass of electrically conductive elements inductively proximate the power-transferring coil 126 may be reduced. As noted above, the reduction in electrically conductive mass may correspondingly reduce eddy currents and in turn in thermal losses.

The inductive power transmitter 104 may also include a thermal mass 130 positioned substantially along the base portion 104c of the inductive power transmitter 104, as opposed to an upper portion 104b of the transmitter. In certain configurations, the thermal mass 130 is aluminum or another metal. In many cases, the thermal mass 130 may be electrically conductive and thus subject to induced eddy currents. As a result, the thermal mass 130 may be positioned substantially below the electromagnetic shield element 127. As noted above, eddy currents may be induced in a conductor by a time-varying magnetic field. However, because the thermal mass is not positioned substantially proximate the power-transferring coil 126, eddy currents are unlikely to develop in the mass. One may appreciate that a magnetic field may dissipate in proportion to $$\frac{1}{r^3},$$

or in other words, the magnetic field may dissipate proportionate to the cube of the distance away from the magnetic field source. Accordingly, the thermal mass 130 may be positioned a distance from the power-transferring coil 126 such that eddy currents are do not form in response to the power transmitted through the power-transferring coil 126.

Further, as noted above, the electromagnetic shield elements 117, 127 may reduce the total amount of flux present below the power-transferring coil 126. In other words, in embodiments including the electromagnetic shield elements 117, 127 in an upper portion 104b, the thermal mass 130 may be positioned in a base portion 104c and thus closer to the bottom surface of the power-transferring coil 126.

In some examples, the mass of the thermal mass 130 may be chosen at least in part on the heat capacity of the material selected therefore. For example, a thermal mass 130 composed of copper may have a lower heat capacity than a thermal mass 130 composed of aluminum. In this case, the mass of a thermal mass 130 formed from copper may be larger than the mass of a thermal mass 130 formed from aluminum. In still further embodiments, metal alloys may be used. In still further embodiments, the thermal mass 130 may be formed of multiple layers of differing materials, such as a water or liquid core surrounded by a heat-sinking or heat-distributing material, one example of which is aluminum and plated in a thermally conductive material, such as silver. One may appreciate that, in this manner, the exterior surface of the thermal mass 130 may conduct heat into the interior surface of the thermal mass 130, which may be adapted to store heat.

Further, the multiple layers may facilitate transferring heat from one location of the thermal mass 130 to another location of the thermal mass 130. In other words, a relative hot spot in or on the thermal mass 130 may be cooled relative to other portions of the thermal mass.

In some embodiments, thermal paths (not shown) may be positioned along a surface such as an interface surface 106, or other surfaces of the inductive power transmitter. For example, the thermal path may be disposed along the selected surface in order to encourage a thermal dissipation path. In some embodiments, the thermal path may be formed from a thermally conductive material, such as a metal trace or other metallic element formed into or on the housing 104a. In some embodiments, a thermal path may be made from a thermally conductive and electrically insulating material. For example, a ceramic doped with metal filaments, particles, granules or other metal fragments may be used to form a thermal path.

Further embodiments may include a configuration in which at least a portion of the thermal mass 130 further forms at least a portion of an electromagnetic interference shield 132. For example, a die cast slot may be sized within the thermal mass 130 such that an electrical circuit element 142 positioned on a substrate 140 is positioned therebelow. In this manner, the thermal mass 130 acts as an electromagnetic shield for the electrical circuit element 142.

In other examples the thermal mass 130 may also include or be a portion of a heat sink. For example, the substrate may be thermally coupled to the thermal mass 130 by one or more areas of a thermal interface 144 which can include thermal paste such that heat generated by elements positioned or coupled to the substrate 140 may be directed to and dissipated within the thermal mass 130. In these embodiments, heat generated by the inductive power transmitter 104 or heat generated by the inductive power receiver 102 placed on the interface surface 106 may be absorbed within the thermal mass 130, to be dissipated in a controlled manner at least through the cable 108.

FIG. 4 also includes a cable 108 for connecting to a power outlet. In many cases, the cable 108 may include at least one conductor pair, and a thermally conductive shield layer positioned to surround the at least one conductor pair. In many embodiments, the conductive shield layer may be thermally coupled to the thermal mass 130. In other cases, a thermally conductive sheathing may enclose the conductor pairs and the thermally conductive shield layer, the thermally conductive sheathing thermally coupled to the thermally conductive shield layer. In many cases, the thermally conductive sheathing may be thermally coupled to the thermal mass 130.

In many cases, the thermally conductive shield layer of the cable 108 may be made of metal and may be of a certain thickness of a material selected specifically for the material's thermal conductivity. In these and related cases, heat stored within the thermal mass 130 may be safely and efficiently transferred away from the thermal mass 130 into the cable 108.

Figure 5:
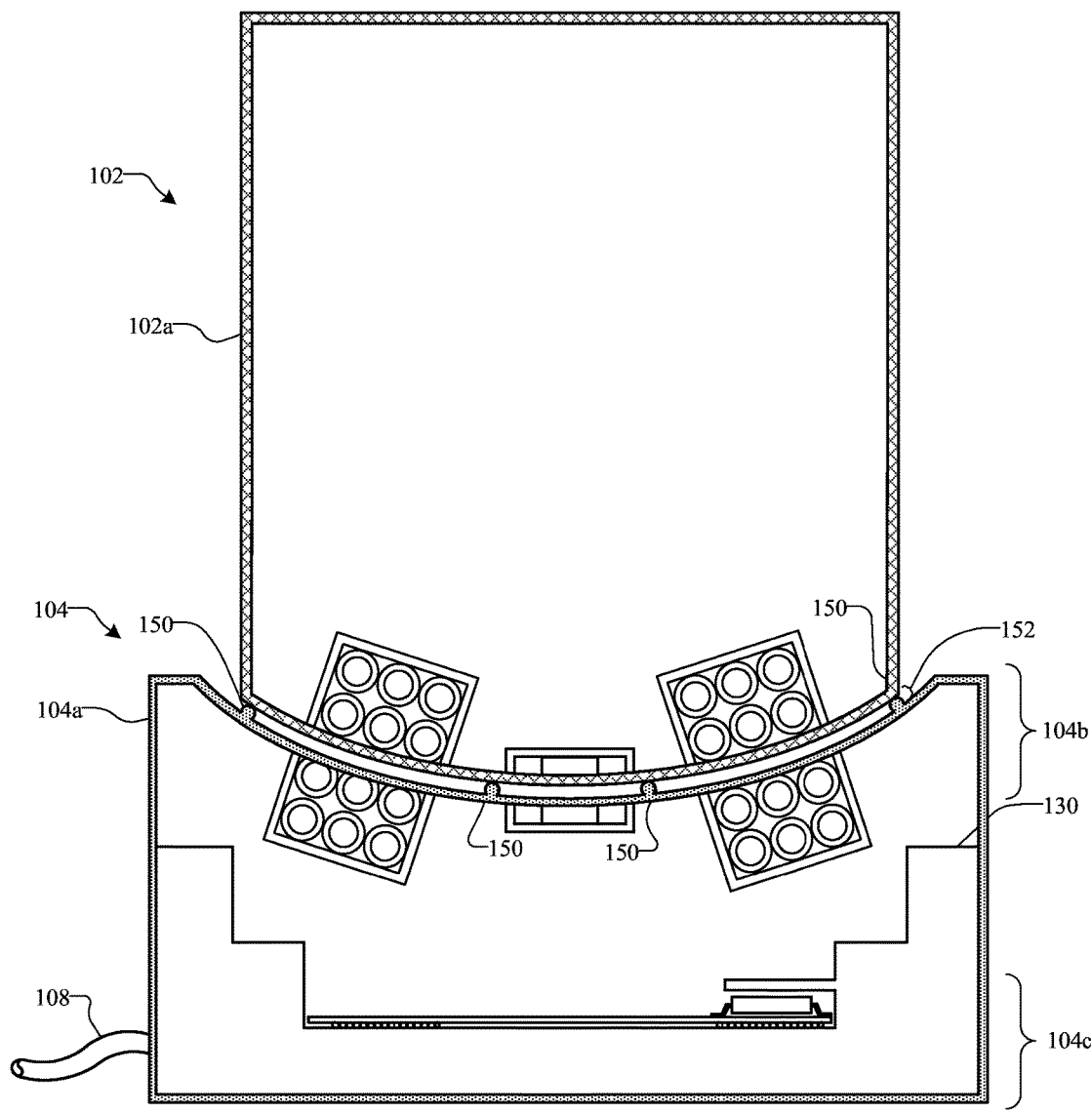
FIG. 5 depicts a cross-section view of another example configuration of the system of FIG. 1A taken along section A-A illustrating a plurality of surface features defining an air gap within an inductive power transfer system.

FIG. 5 is a cross-section of another example configuration of the system of FIG. 1A taken along section A-A illustrating a number of protrusion surface features 150 (such as ribs, bumps, walls, rings and the like) that cooperate to define an air gap 152 between the inductive power receiver 102 and the inductive power transmitter 104. In this example, the surface features 150 separate the inductive power receiver 102 from the inductive power transmitter 104 by a selected distance. One may appreciate that an air gap 152 may reduce the heat radiated by, or otherwise passing from, the inductive power receiver 102 into the inductive power transmitter 104; some such heat may be dissipated in the air gap 152 and/or the air gap 152 may prevent such radiation.

Although illustrated with the surface features 150 present on the interface surface of the inductive power transmitter 104, one may appreciate that the plurality of surface features 150 may also be present on the bottom surface of the inductive power receiver 102. In other cases, surface features may be positioned along the surface of both the inductive power receiver 102 and the inductive power transmitter 104. Although air gap 152 is illustrated at a certain distance, one may appreciate that any suitable distance is contemplated. For example, the air gap 152 may be on the order of micrometers, or in other cases, the air gap 152 may be a centimeter or more. One may further appreciate that the efficiency of the power transfer between the inductive power transmitter 104 and the inductive power receiver 102 may directly depend on the distance of the air gap 152.

Figure 6:
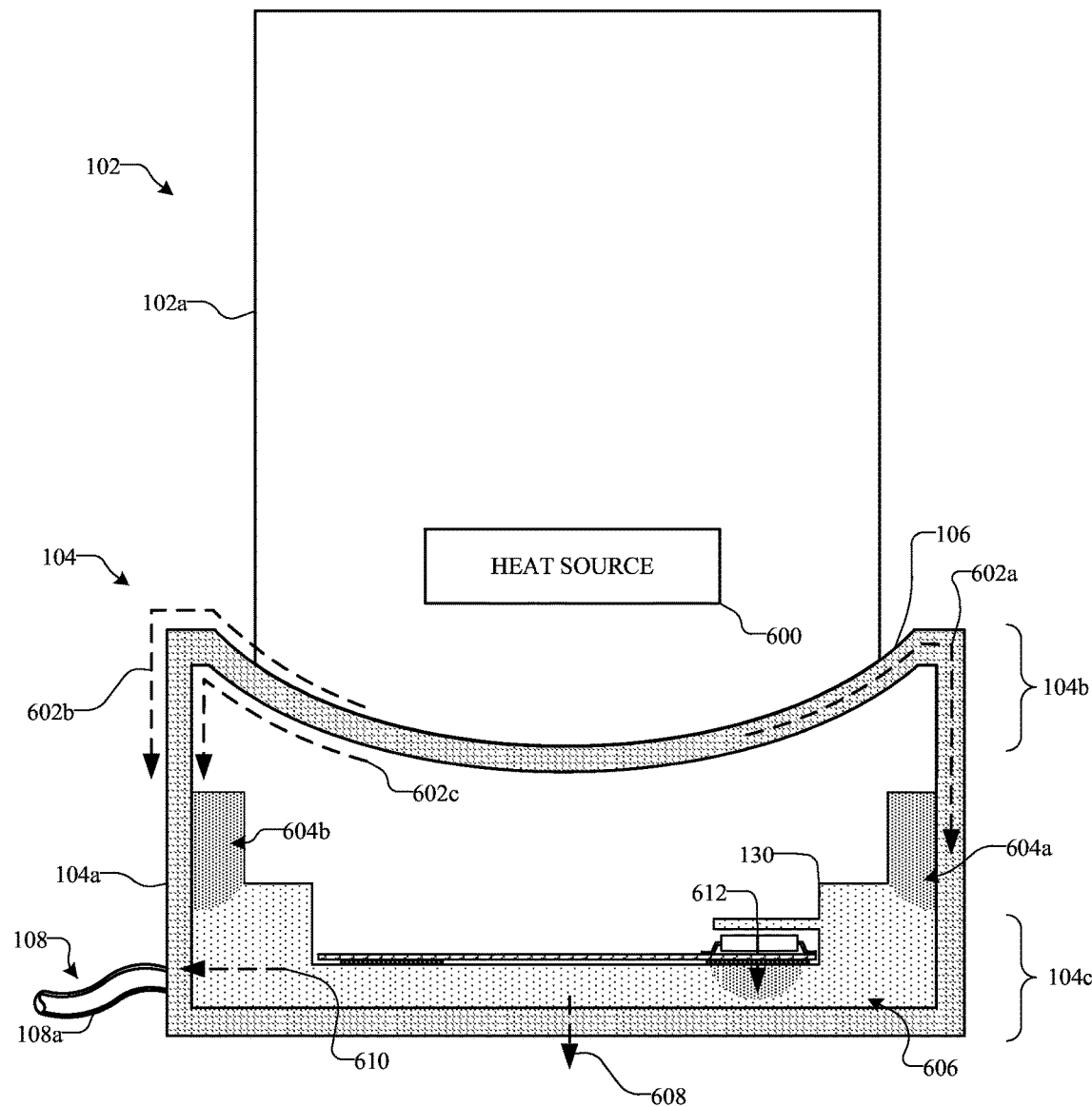
FIG. 6 depicts a simplified cross-section view of the system of FIG. 1A taken along section A-A, illustrating a plurality of example thermal paths to a thermal mass associated with an inductive power-transferring apparatus.

FIG. 6 is a simplified cross-section of the system of FIG. 1A taken along section A-A, illustrating a plurality of example thermal paths to a thermal mass associated with an inductive power-transferring apparatus. The thermal paths can direct heat generated by the inductive power receiver 102 into and away from the inductive power transmitter 104.

For example, and as noted above, the inductive power receiver 102 of many embodiments can include within its housing 102a a processor, a memory, a power supply and/or battery, network communications, touch sensors, input sensors, force sensors, environmental sensors, one or more display screens, acoustic elements, input/output ports, haptic elements, digital and/or analog circuitry for performing and/or coordinating tasks of the inductive power receiver 102, and so on. As can be appreciated, many of these elements may generate heat when in operation. Heat, as noted above, can decrease the operational efficiency of elements within the inductive power receiver 102 and of the inductive power transfer interface itself.

Further, because each of the elements within the inductive power receiver 102 can be formed from electrically conductive materials and/or can be coupled to (or adjacent to) electrical traces that are formed from electrically conductive materials, there may be a risk of generating additional heat as a result of eddy currents induced by the operation of the inductive power transfer interface within these electrically conductive materials.

Further, in certain embodiments hot spots may develop along the upper surface of inductive power transmitter 104 during inductive power transfer. The temperature may increase at these spots due to the spots' proximity to the transmit and power-consuming coils. In many examples, the hot spots may provide an undesirable user experience to a user operating the inductive power transmitter 104 or the inductive power receiver 102.

Accordingly, for simplicity of illustration, all heat generating or accumulating elements within or associated with the inductive power receiver 102 are collectively represented in FIG. 6 as a heat source 600.

As shown, several possible thermal paths are illustrated that direct heat (e.g., thermal energy) from the bottom surface of the inductive power receiver 102 into the inductive power transmitter 104. In this manner, undesirable hot spots may be eliminated (or reduced) and the operational efficiency of both the inductive power receiver 102 and the inductive power transfer interface may increase.

Once thermal energy is directed away from the bottom surface of the inductive power receiver 102, it can be effectively stored and/or directed to the thermal mass 130, which can be formed so as to have a high heat capacity. In this manner, the thermal mass 130 can rapidly direct heat away from the inductive power receiver 102, storing said head until it can be radiated into the ambient environment, radiated away upon removal of the inductive power receiver 102 from the inductive power transmitter 104 (e.g., at a later time), or otherwise away from the inductive power receiver 102.

In many examples, thermal paths can couple the top surface of the housing 104a of the inductive power transmitter 104 to the thermal mass 130. In some embodiments, a thermal path 602a can be formed within the housing 104a of the inductive power transmitter 104 itself. In these examples, the housing 104a of the inductive power transmitter 104 can be formed from a material that is highly thermally conductive. For example, in some embodiments, the housing 104a of the inductive power transmitter 104 can be formed from metal. In other examples, the housing 104a of the inductive power transmitter 104 can be formed from a ceramic material that may be doped with a thermally conductive dopant so as to increase the thermal conductivity of the ceramic material. Typically, the thermal paths described herein have a thermal conductivity that is greater than a thermal conductivity of an area from which heat is conducted, such as the interface area or the interface surface 106.

In other embodiments, a thermal path 602b can be formed within a coating disposed on the inner or outer surface of the housing 104a of the inductive power transmitter 104. In these examples, the coating can be formed from a material having a high thermal conductivity. For example, in some embodiments, the coating can be formed from a metal material. In other examples, the coating can be formed from a thermally conductive polymer or a ceramic material. In still further embodiments, the material selected for the coating can be doped with a thermally conductive dopant to as to increase the thermal conductivity of the coating.

In many examples, the coating on the inner or outer surface of the housing 104a of the inductive power transmitter 104 can be disposed to cover the entire outer surface and/or sidewalls of the housing 104a. In other examples, the coating can be formed into stripes and/or physical thermal paths. In some embodiments, the coating can be formed from a material that aesthetically matches the material selected for the housing 104a of the inductive power transmitter 104. For example, in some embodiments such as the embodiment illustrated in FIG. 1B, the inductive power transmitter 104 can take a substantially cylindrical (e.g., disk) shape. In these examples, the coating can be disposed in a hub-spoke configuration. In other words, the thermally conductive coating can be applied in radial stripes originating at the center of the top surface of the housing. In other embodiments, the coating can be applied in another pattern.

In some embodiments, a thermal path 602c can be formed within a coating disposed on the inner surface of the housing 104a of the inductive power transmitter 104. As with coatings that may be disposed on the outer surface of the housing 104a of the inductive power transmitter 104, the coating forming the thermal path 602 can be formed from a material having a high thermal conductivity. For example, in some embodiments, the coating can be formed from a metal material. In other examples, the coating can be formed from a thermally conductive polymer or a ceramic material. In still further embodiments, the material selected for the coating can be doped with a thermally conductive dopant to as to increase the thermal conductivity of the coating.

As with coatings which may define the thermal paths 602b, the coating defining the thermal path 602c can be disposed to cover the entire interior surface and/or sidewalls of the housing. In other examples, the coating can be formed into stripes and/or physical thermal paths. As with coatings which may define the thermal paths 602b, the coating defining the thermal path 602c can be disposed in a hub-spoke configuration. In other words, the thermally conductive coating can be applied in radial stripes originating at the center of the top surface of the housing 104a. In other embodiments, the coating can be applied in another pattern.

As noted above, the thermal paths 602a, 602b, and 602c can be configured to direct heat into the thermal mass 130, where the heat may temporarily accumulate. The point at which the thermal paths 602a, 602b, and 602c thermally couple to the thermal mass 130 can cause (in some embodiments) hot spots 604a, 604b to develop. In other embodiments, the heat capacity and the thermal conductivity of the material (or materials) used to form the thermal mass 130 can mitigate the development of hot spots 604a, 604b. For example, if the thermal mass 130 is formed from a material with a high thermal conductivity, the hot spots 604a, 604b may not develop.

The heat conducted through the thermal paths 602a, 602b, and 602c into the thermal mass 130 (through the hot spots 604a, 604b) can accumulate in the bulk 606 of the thermal mass 130, causing the net temperature of the thermal mass 130 to rise. In many examples, the heat capacity of the material (or materials) selected for the thermal mass 130 can be selected based at least in part on an estimated maximum usage time of the inductive power transfer interface. For example, if the inductive power transfer interface is expected to operate for no more than one hour at a time, the heat capacity of the thermal mass 130 can be selected so as to effectively absorb, accumulate, and store the heat generated by the heat source 600 over the course of an hour.

In other examples, and as illustrated, heat accumulated in the bulk 606 of the thermal mass 130 can be radiated through the bottom surface of the thermal mass into the ambient environment via a thermal path 608. In other examples, heat accumulated by the thermal mass 130 can be radiated through one or more sidewalls of the thermal mass 130 into the ambient environment (not shown).

In addition, heat accumulated within the bulk 606 of the thermal mass 130 can be radiated out through the cable 108. In these examples, the thermal mass 130 can be thermally coupled to one or more thermally conductive portions of the cable 108. For example, in some embodiments, the cable 108 can include a shielding and/or grounding sheath 108a which can be coupled to the thermal mass 130 in order to direct thermal energy away therefrom. In other examples, the thermal mass can be thermally coupled to one or more wires or wire bundles within the cable 108. For example, the thermal mass 130 can be coupled to a ground connection within the cable 108. In another embodiment, the thermal mass 130 can be coupled to an electrically live wire via an electrically inert but thermally conductive element (not shown).

In further embodiments, the thermal mass 130 can be configured to absorb and accumulate heat generated within the inductive power transmitter 104 itself. For example, a thermal paste can be disposed below operational components of the inductive power transmitter 104 so as to form a thermal path 612.

Additionally, in many embodiments, the thermal mass 130 may be (as illustrated) disposed within the housing 104a of the inductive power transmitter 104 a certain distance away from the interface surface 106 that is in direct contact with the inductive power receiver 102 and the heat source 600. The physical separation of the thermal mass 130 and the bottom surface of the inductive power receiver 102 can facilitate radiation of heat from the thermal mass 130 away from the inductive power receiver 102. Accordingly and more generally, thermal paths (e.g., the thermal paths 602a, 602b, 602c) may be incorporated into the upper portion 104b or other part of the housing 104a of the inductive power transmitter 104.

As noted, the housing 104a may be made from a first material that has a first thermal conductance, and a thermal path may be made from a second material having a second thermal conductance. In other examples, the housing 104a and the thermal paths may be made of the same material. By way of example, the housing 104a may be made from a ceramic material and the thermal paths may be made from a ceramic or plastic material doped with metal filaments. In many cases, the metal filaments may be selected for their thermal conductivity. The metal filaments used as a dopant may increase the thermal conductivity of the thermal path, but may also increase the risk of efficiency losses due to eddy currents forming therein. In these examples, the metal filaments may be sized so that eddy currents are unlikely to form, or do not form. In alternative embodiments, thermal paths containing metal filaments may be disposed in a particularly selected geometry (e.g., serpentine pattern, spoke-and-hub pattern, hatch pattern, grid pattern and so on). The selected geometry of the thermal paths may be chosen to reduce or eliminate the potential for eddy currents to develop.

Some further embodiments include thermal paths that wrap around the housing 104a of the inductive power transmitter 104. For example, a thermal path may be defined to distribute heat from a hot spot of the inductive power receiver 102 to the outer edges of the housing 104a of the inductive power transmitter 104. In these examples, the heat may be more efficiently dissipated because the surface area of the housing 104a of the inductive power transmitter 104 is greater than the surface area of the hot spot itself.

In many embodiments, the thermal paths may direct heat away from the interface area of the inductive power transmitter 104 toward the thermal mass.

In still further embodiments, the thermal paths may direct heat away from the interface area into a cable 108. In such an embodiment, the cable 108 and a thermally conductive shield layer positioned to surround the at least one conductor pair that is thermally coupled to the housing 104a of the inductive power transmitter 104. In this manner, the thermally conductive shielding of the cable 108 may serve as an additional or alternate thermal path. In other words, heat generated at the interface area may be directed by the thermal paths into either the thermal mass 130 or the cable 108. In this manner, the cable 108 may be configured to direct heat away from the inductive power transmitter 104.

Figure 7:
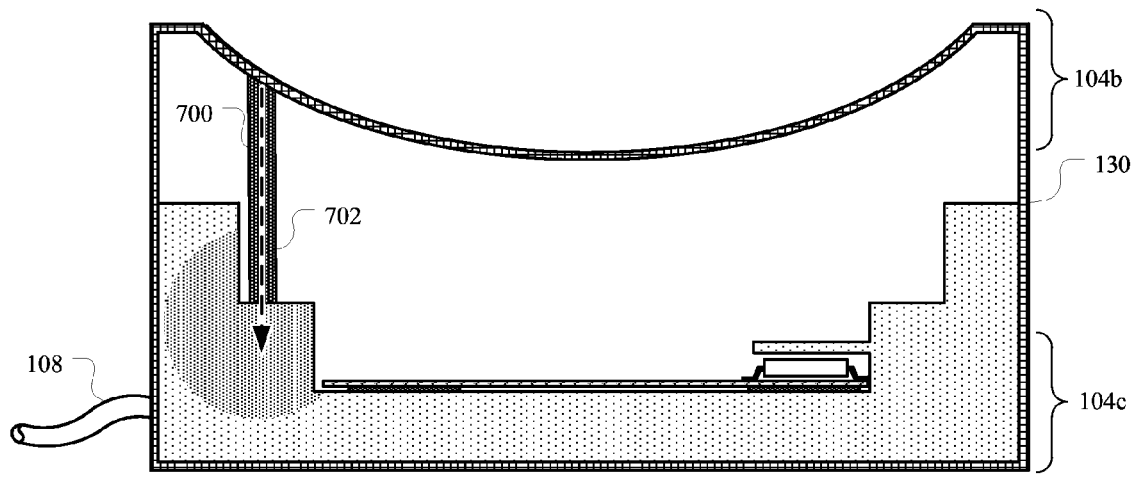
FIG. 7 depicts a cross-section view of another example configuration of the system of FIG. 1A taken along section A-A illustrating a thermal via thermally coupling at least a portion of an upper surface 104*b* and a thermal mass 130 associated with an inductive power-transferring apparatus.

FIG. 7 is a cross-section of related to an example configuration of the system of FIG. 1, taken along section A-A, illustrating a thermal path taking the form of a thermal via 700 thermally coupling, and forming a thermal path 702 therebetween, an upper portion or surface of the inductive power transmitter 104 and a thermal mass 130 positioned below.

In the present disclosure, the methods disclosed may be implemented as sets of instructions or software readable by a device. Further, it is understood that the specific order or hierarchy of steps in the methods disclosed are examples of sample approaches. In some embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. A charging apparatus comprising:
a housing including an upper portion defining an interface surface and a lower portion defining a bottom wall;
a power source positioned within the housing;
a power-transferring coil coupled to the power source and positioned within the housing and below the interface surface;
a thermal mass positioned within the lower portion of the housing and extending along the bottom wall;
a thermal path configured to conduct heat from the interface surface to the thermal mass; and
an electromagnetic shield positioned adjacent and extending along at least three sides of the power-transferring coil and separated from the thermal mass by a gap such that the electromagnetic shield is between the power-transferring coil and the thermal mass, the electromagnetic shield shields the thermal mass from a time-varying magnetic field generated by the power-transferring coil and directs electrical flux associated with the power-transferring coil toward the interface surface and away from the thermal mass.

2. The charging apparatus of claim 1, further comprising:
a cable attached to the housing and comprising:
a conductor pair; and
a thermally conductive shield layer surrounding the conductor pair, wherein the conductive shield layer is thermally coupled to the thermal mass.

3. The charging apparatus of claim 2, wherein:
the cable further comprises a thermally conductive sheath enclosing the conductor pair and the thermally conductive shield layer and
the thermally conductive sheath is thermally coupled to the thermally conductive shield layer.

4. The charging apparatus of claim 1, wherein:
the interface surface is configured to engage a surface of an external power-consuming apparatus; and
the power-transferring coil is configured to inductively couple with a power-consuming coil of the external power-consuming apparatus.

5. The charging apparatus of claim 4, wherein the interface surface is configured to direct heat from the external power-consuming apparatus to the thermal path.

6. The charging apparatus of claim 4, wherein the interface surface includes a surface feature that is configured to engage with the surface of the external power-consuming apparatus.

7. The charging apparatus of claim 6, wherein the surface feature includes an axially symmetric curved indentation.

8. The charging apparatus of claim 6, wherein:
the surface feature includes a rib feature configured to provide an air gap between the interface surface and the surface of the external power-consuming apparatus; and
the air gap is configured to reduce an amount of heat from passing from the charging apparatus to the external power-consuming apparatus.

9. The charging apparatus of claim 4, wherein the thermal path comprises one or more thermal vias.

10. An inductive power-transferring apparatus comprising:
a housing comprising:
an upper portion defining an interface surface having a first thermal conductivity;
a base portion incorporating a thermal mass extending along a bottom wall; and
a thermal path thermally coupling the interface surface and the thermal mass and having a second thermal conductivity greater than the first thermal conductivity;
a power source positioned within the housing;
a power-transferring coil coupled to the power source and positioned within the housing below the interface surface; and
an electromagnetic shield positioned adjacent and extending along at least three sides of the power-transferring coil and separated from the thermal mass by a gap such that the electromagnetic shield is between the power-transferring coil and the thermal mass, the electromagnetic shield shields the thermal mass from a time-varying magnetic field generated by the power-transferring coil and directs electrical flux associated with the power-transferring coil toward the interface surface and away from the thermal mass.

11. The inductive power-transferring apparatus of claim 10, wherein the thermal path includes a thermal via extending from the interface surface to the thermal mass.

12. The inductive power-transferring apparatus of claim 10, wherein the thermal path is formed from one of a metal, a polymer doped with a thermally conductive material, or a ceramic doped with the thermally conductive material.

13. The inductive power-transferring apparatus of claim 10, wherein at least a portion of the thermal mass is an electromagnetic interference shield.

14. The inductive power-transferring apparatus of claim 10, wherein the upper portion comprises an electrically insulating and thermally conducting material.

15. The inductive power-transferring apparatus of claim 10, wherein the upper portion comprises a plastic doped with thermally conductive metal filaments.

16. The inductive power-transferring apparatus of claim 10, wherein at least a portion of the thermal mass further comprises a heat sink for a component disposed within the housing.

17. The inductive power-transferring apparatus of claim 10, further comprising a processing unit that is configured to discontinue current to the power-transferring coil upon determining that a selected temperature threshold is reached.

18. The inductive power-transferring apparatus of claim 10, wherein the power-transferring coil is formed from a material including one or more of a copper alloy material, a silver alloy material, or a copper-silver alloy material.

19. A method for managing a temperature of an induction power-transferring apparatus, the method comprising:
  receiving, at an interface surface of the induction power-transferring apparatus, heat from an accessory positioned proximate to the interface surface;
  directing the heat received at the interface surface through at least one thermal path to a thermal mass extending along a bottom wall of the induction power-transferring apparatus;
  directing heat within the thermal mass to a cable for connecting to a power outlet, the cable comprising a thermally conductive layer; and
  shielding the thermal mass from a time-varying magnetic field generated by a power-transferring coil with an electromagnetic shield, the electromagnetic shield positioned adjacent and extending along at least three sides of the power-transferring coil and separated from the thermal mass by a gap such that the electromagnetic shield is between the power-transferring coil and the thermal mass, the electromagnetic shield directing electrical flux associated with the power-transferring coil toward the interface surface and away from the thermal mass.

20. The method of claim 19, wherein directing the heat within the thermal mass to the cable comprises directing heat to an electrically conductive layer surrounding a conductor pair of the cable.

21. The method of claim 19, wherein receiving the heat from the accessory comprises:
  aligning the accessory to contact the interface surface;
  transmitting inductive power to the accessory; and
  receiving heat generated within the accessory, the heat a result of transmitting the inductive power.

22. The method of claim 21, wherein directing heat through the at least one thermal path to the thermal mass comprises directing, to the thermal mass, heat generated within the apparatus as a result of transmitting the inductive power.

23. The method of claim 19, wherein receiving heat from the accessory comprises:
  aligning the accessory along an axis of the interface surface, the accessory separated from the surface of the interface surface by an air gap;
  transmitting inductive power to the accessory; and
  receiving heat generated within the accessory, the heat a result of transmitting inductive power;
  wherein the air gap inhibits a transfer of heat from the induction power-transferring apparatus to the accessory.

* * * * *